(12) United States Patent
Barton et al.

(10) Patent No.: US 8,490,175 B2
(45) Date of Patent: Jul. 16, 2013

(54) SECURITY METHOD FOR MOBILE AD HOC NETWORKS WITH EFFICIENT FLOODING MECHANISM USING LAYER INDEPENDENT PASSIVE CLUSTERING (LIPC)

(75) Inventors: Melbourne Barton, Somerville, NJ (US); Taek Jin Kwon, Morganville, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 13/312,250

(22) Filed: Dec. 6, 2011

(65) Prior Publication Data
US 2013/0145461 A1    Jun. 6, 2013

(51) Int. Cl.
*H04L 29/06* (2006.01)
*G06F 15/16* (2006.01)

(52) U.S. Cl.
USPC .................................. 726/14; 726/1; 726/22

(58) Field of Classification Search
None
See application file for complete search history.

(56) References Cited

U.S. PATENT DOCUMENTS

| | | | |
|---|---|---|---|
| 7,864,959 B2* | 1/2011 | Dhawan | 380/269 |
| 8,184,545 B2* | 5/2012 | Sergeev et al. | 370/249 |
| 8,239,537 B2* | 8/2012 | Wood | 709/226 |
| 2008/0084294 A1* | 4/2008 | Zhiying et al. | 340/539.22 |
| 2009/0328148 A1* | 12/2009 | Lee et al. | 726/3 |
| 2011/0016513 A1* | 1/2011 | Bailey, Jr. | 726/5 |
| 2011/0154497 A1* | 6/2011 | Bailey, Jr. | 726/25 |
| 2011/0209215 A1* | 8/2011 | Kabbara | 726/22 |
| 2012/0171961 A1* | 7/2012 | Qi et al. | 455/41.2 |
| 2012/0271954 A1* | 10/2012 | Wood | 709/226 |

OTHER PUBLICATIONS

T. J Kwon, M. Gerla, V. K. Varma, M. Barton, and T. R. Hsing, "Efficient Flooding with Passive Clustering (PC)—an Overhead-Free Classifying Mechanism in Ad Hoc/Sensor Networks", in Proc. of the IEEE, vol. 91, No. 8, Aug. 2003, pp. 1210-1220.

H-Y. Lin, Y-M. Huang, and T-I. Wang, "Resilient Cluster-Organizing Key Management and Secure Routing Protocol for Mobile Ad Hoc Networks", IEICE Trans. Commun., vol. E88-B, No. 9, Sep. 2005, pp. 3598-3613.

M. Jiang, J. Li, and Y. C. Tay, "Cluster Based Routing Protocol (CBRP)", Internet Draft, draft-ietf-manet-cbrp-spec-01.txt, Aug. 14, 1999.

Y. Zhang and W. Lee, "Intrusion Detection in Wireless Ad-Hoc Networks", in Proc. of the 6th International Conference on Mobile Computing and Networking (MobiCom'2000), pp. 275-283, Boston, MA, Aug. 2000.

(Continued)

*Primary Examiner* — Christopher Revak
(74) *Attorney, Agent, or Firm* — Philip J. Feig

(57) ABSTRACT

A security method and system for Layer Independent Passive Clustering (LIPC) is presented. The inventive method and system maintains the states in the LIPC cluster formation protocol while adding a 'Trusworthy' event to each state and provides a methodology that depends on the state of the transmitting node to quantify Trustworthy and derive a Trust Confidence Value (TCV) to represent the level of confidence in quantifying 'Trustworthy'. The invention dynamically computes a degree of trustworthiness for each participating network node and eliminates nodes from participating in the PC cluster formation protocol and packet forwarding if they do not meet established trust metrics. The security solution can also apply to PC-based Mobile Ad hoc Networks (MA-NETs). The novel system and method applies a multidimensional set of security algorithms to protect the LIPC cluster formation protocol from malicious attacks that compromise cluster formation and secure routing.

18 Claims, 6 Drawing Sheets

OTHER PUBLICATIONS

O. Kachirski and R. Guha, "Effective Intrusion Detection Using Multiple Sensors in Wireless Ad Hoc Networks", in Proc. of the 36th Hawaii International Conference on System Sciences (HICSS'03), Track 2, p. 57.1, Waikoloa, Hawaii, Jan. 2003.

Z. Liu, A. W. Joy, and R. A. Thompson, "A Dynamic Trust Model for Mobile Ad Hoc Networks", in Proc. of the 10th IEEE International Workshop on Future Trends of Distributed Computing Systems (FTDCS'2004), Suzhou, China, May 2004.

H. Li and M. Singhal, "A Secure Routing Protocol for Wireless Ad Hoc Networks", in Proc. of the 39th Hawaii International Conference on System Sciences (HICSS'06), Track 9, p. 225a, Kauai, Hawaii, Jan. 2006.

P. K. Chan, M. V. Mahoney, and M. H. Arshad, "Learning Rules and Clusters for anomaly Detection in Network Traffic", In Managing Cyber Threats: Issues, Approaches and Challenges, V. Kumar, J. Srivastava & A. Lazarevic (editors), Springer, pp. 81-99, 2005.

S. Yi, A. F. Harris, and R. Kravets, "Quality of Authentication in Ad Hoc Networks", Illinois Digitial Environment for Access to Learning and Scholarship (IDEALS), University of Illinois, https://www.ideals.illinois.edu/bitstream/handle/2142/11376/Quality%20of%20Authentication%20in%20Ad%20Hoc%20Networks.pdf?sequence=2 .

\* cited by examiner

SECURITY METHOD FOR MOBILE AD HOC NETWORKS WITH EFFICIENT FLOODING MECHANISM USING LAYER INDEPENDENT PASSIVE CLUSTERING (LIPC)

FIELD OF THE INVENTION

This invention relates generally to mobile ad hoc networks and in particular to a security method for mobile ad hoc networks.

BACKGROUND OF THE INVENTION

Passive Clustering (PC) is an overhead-free classifying mechanism proposed by the University of California at Los Angeles (UCLA) to improve flooding efficiency in dense ad hoc networks where flooding is a major contributor to the control overhead. PC does not require that all participating network nodes advertise cluster-dependent information. The UCLA PC implementation was not realized because of difficulties in modifying the radio-layer Media Access Control (MAC) protocol to carry the cluster state information. In response to these difficulties, the inventors of the present invention developed a Layer Independent PC (LIPC) scheme that enables the cluster state information to be carried at any protocol layer.

Cluster-Based Key Management (CBKM) and secure routing schemes have been proposed to take advantage of cluster-based wireless ad hoc network infrastructures, and provide secure cluster head election, key management and secure routing. In traditional CBKM schemes, cluster domain members elect a cluster head as the dominant certificate authority (CA) using an election mechanism that takes into account such factors as the number of accusations, the mobile speed, distance between neighboring nodes, and length of time the node is a cluster head. Client nodes query their cluster heads for certificates, and periodically broadcast hello messages containing info nation, e.g., neighbor nodes, adjacent clusters, certificate repositories, etc., to maintain synchronization of cluster membership.

To accomplish secure routing, cluster heads propagate cluster secure route request (CSRREQ) packets from source to destination, and propagate the corresponding cluster secure route reply (CSRREP) packets from destination to source. CSRREQ and CSRREP packets are authenticated at each cluster head in the communication path and protected using a Rivest-Shamir-Aldeman (RSA) algorithm.

The cluster head election algorithm uses an (n,k) threshold cryptography, weight-based scheme to convict malicious nodes and elect stable cluster heads. This scheme is complex and technically difficult to implement in a LIPC environment that does not have extra control packets, unless significant changes are made to the LIPC cluster formation algorithm. No methodology is provided for estimating the level of convicted accusation for each node.

Another approach to CBKM uses host-based (or network-based) intrusion detection and response techniques for wireless ad hoc networks. One technique in this approach proposes a distributed anomaly detection model where trace analysis and anomaly detection is done locally at each node, with possible cooperation among nodes to increase overall effectiveness. This technique provides a generic framework for intrusion detection in wireless ad hoc networks. However, the technique neither specifies a security solution that fits the LIPC structure, nor takes advantage of the overhead reduction mechanisms of LIPC.

Alternatively, a distributed intrusion detection system has been proposed that is based on mobile agent technology. The trust level is dynamically updated using reports from threat detection tools. This mobile agent-based intrusion detection scheme is an effective way to distribute intrusion detection functionality among multiple hosts, but is problematic because mobile agents may be the primary targets of attack.

In another approach, trust models are used to compute and assign a trust level to each ad hoc network node. The trust models require the use of extra control packets (hello messages) to maintain trust tables, and align well with active clustering schemes, but these trust models do not align well with passive clustering schemes.

No security solutions have been developed to protect PC and LIPC cluster formation and to protect PC and LIPC from malicious attacks, such as passive eavesdropping, broadcasting false routing information, and active filtering from adversarial nodes. Such malicious attacks could force illegal node state transitions and compromise secure routing of control packets or user traffic. As discussed above, several schemes have been proposed to secure routing protocols for wireless and mobile ad hoc networks. They however have not been applied to LIPC, and will not work reliably and efficiently for LIPC. This is because, unlike conventional clustering algorithms, LIPC has the following features. LIPC does not need extra control packets, e.g., hello messages with neighbor lists, to form clusters, LIPC does not require an initialization period to enhance flooding efficiencies, and LIPC operates in soft state clustering mode with a timeout feature to preserve freshness of the state of each node.

The security solutions known in the art for protecting wireless and mobile ad hoc networks rely on control packets, an initialization period and/or operation in stateless mode. Proposals for securing cluster-based ad hoc networks focus primarily on conventional active clustering schemes, and so depend strongly on explicit signaling mechanisms to carry protocol-specific control packets. As such, these security solutions rely on some level of feedback from, and coordination among, the different nodes in the network to implement their Intrusion Detection System (IDS).

SUMMARY OF THE INVENTION

Cluster-based ad hoc networks are prone to malicious attacks and have difficulties detecting adversarial nodes. Hence an inventive security method and system for LIPC is presented; the inventive system and method dynamically computes a degree of trustworthiness for each participating network node and eliminates nodes from participating in the PC cluster formation protocol and packet forwarding if they do not meet established trust metrics. The security solution can also apply to PC-based Mobile Ad hoc Networks (MANETs), including any MANET that uses a cluster formation protocol.

A novel system and method to apply a multidimensional set of security algorithms to protect the LIPC cluster formation protocol from malicious attacks that compromise cluster formation and secure routing is presented. The number and types of security algorithms that comprise the multidimensional set is not restricted by the inventive method.

A novel method for security in mobile ad hoc networks with efficient flooding mechanism using LIPC is presented. The method can be performed using a processor on a mobile device at a receiving node to compute trustworthiness of a transmitting node upon receipt of a packet from the transmitting node.

The method for security in mobile ad hoc networks with efficient flooding mechanism using LIPC comprises computing, using a processor, trustworthiness of a transmitting node, upon receiving a packet from the transmitting node; when the transmitting node is not trustworthy, dropping the packet; when the transmitting node is trustworthy and the receiving node is in CH state and when a transmitting node of an other packet is trustworthy and the transmitting node of the other packet is in the CH state and received packet ID is less than ID of the receiving node and a number of GW nodes are less than the offset and the scaled number of CH nodes, transitioning the receiving node to the GW state; when the transmitting node is trustworthy and the receiving node is in the CH state and when the transmitting node of the other packet is trustworthy and the transmitting node of the other packet is in CH state, the received packet ID is less than the ID of the receiving node, the number of GW nodes are greater than or equal to the offset and the scaled number of CH nodes, transitioning the receiving node to ORD state; when the transmitting node is trustworthy and the receiving node is in the GW state and the number of GW nodes are greater than or equal to an offset and scaled number of CH nodes, transitioning the receiving node to the ORD state; when the transmitting node is trustworthy and the receiving node is in the CH Ready state and the packet is to be transmitted, transitioning the receiving node to the CH state; when the transmitting node is trustworthy and the receiving node is in the CH Ready state and the other packet is received before the packet is transmitted and when the transmitting node of the other packet is trustworthy and the transmitting node of the other packet is in the CH state and the received packet ID is less than the ID of the receiving node and the number of GW nodes are less than the offset and the scaled number of CH nodes, transitioning the receiving node to the GW state; when the transmitting node is trustworthy and the receiving node is in the CH Ready state and the other packet is received before the packet is transmitted and when the transmitting node of the other packet is trustworthy and the transmitting node of the other packet is in the CH state, the received packet ID is less than the ID of the receiving node, the number of GW nodes are greater than or equal to the offset and the scaled number of CH nodes, transitioning the receiving node to the ORD state; when the transmitting node is trustworthy and the receiving node is in the ORD state and the other packet is received before the packet is transmitted and when the transmitting node of the other packet is trustworthy and the number of GW nodes are less than the offset and the scaled number of CH nodes, transitioning the receiving node to the GW state; when the transmitting node is trustworthy and the receiving node is in INITIAL state and when the transmitting node of the other packet is trustworthy and the transmitting node of the other packet is not in the CH state, transitioning the receiving node to the CH Ready state; when the transmitting node is trustworthy and the receiving node is in the INITIAL state and when the transmitting node of the other packet is trustworthy and the transmitting node of the other packet is in the CH state, transitioning the receiving node to the GW state; and when a time without network activity has elapsed, transitioning the received node to the INITIAL state.

A novel system for security in mobile ad hoc networks with efficient flooding mechanism using LIPC is presented. The system comprises a processor, such as a processor in a mobile device, and a module operable to compute trustworthiness of a transmitting node, upon receiving a packet from the transmitting node; when the transmitting node is not trustworthy, to drop the packet; when the transmitting node is trustworthy and the receiving node is in CH state and when a transmitting node of an other packet is trustworthy and the transmitting node of the other packet is in the CH state and received packet ID is less than ID of the receiving node and a number of GW nodes are less than the offset and the scaled number of CH nodes, to transition the receiving node to the GW state; when the transmitting node is trustworthy and the receiving node is in the CH state and when the transmitting node of the other packet is trustworthy and the transmitting node of the other packet is in CH state, the received packet ID is less than the ID of the receiving node, the number of GW nodes are greater than or equal to the offset and the scaled number of CH nodes, to transition the receiving node to ORD state; when the transmitting node is trustworthy and the receiving node is in the GW state and the number of GW nodes are greater than or equal to an offset and scaled number of CH nodes, to transition the receiving node to the ORD state; when the transmitting node is trustworthy and the receiving node is in the CH Ready state and the packet is to be transmitted, to transition the receiving node to the CH state; when the transmitting node is trustworthy and the receiving node is in the CH Ready state and the other packet is received before the packet is transmitted and when the transmitting node of the other packet is trustworthy and the transmitting node of the other packet is in the CH state and the received packet ID is less than the ID of the receiving node and the number of GW nodes are less than the offset and the scaled number of CH nodes, to transition the receiving node to the GW state; when the transmitting node is trustworthy and the receiving node is in the CH Ready state and the other packet is received before the packet is transmitted and when the transmitting node of the other packet is trustworthy and the transmitting node of the other packet is in the CH state, the received packet ID is less than the ID of the receiving node, the number of GW nodes are greater than or equal to the offset and the scaled number of CH nodes, to transition the receiving node to the ORD state; when the transmitting node is trustworthy and the receiving node is in the ORD state and the other packet is received before the packet is transmitted and when the transmitting node of the other packet is trustworthy and the number of GW nodes are less than the offset and the scaled number of CH nodes, to transition the receiving node to the GW state; when the transmitting node is trustworthy and the receiving node is in INITIAL state and when the transmitting node of the other packet is trustworthy and the transmitting node of the other packet is not in the CH state, to transition the receiving node to the CH Ready state; when the transmitting node is trustworthy and the receiving node is in the INITIAL state and when the transmitting node of the other packet is trustworthy and the transmitting node of the other packet is in the CH state, to transition the receiving node to the GW state; and when a time without network activity has elapsed, to transition the received node to the INITIAL state.

In one aspect, trustworthiness can be computed by processing the received packet in accordance with an algorithm and a local repository; executing an inference engine; computing a trust confidence value; and averaging the trust confidence value. In one aspect, the algorithm can be a multidimensional set of security algorithms. In one aspect, the trust confidence value is computed with state values, weight values assigned to the state values, and a probability based on a trust decision and the weight values maximize the trust confidence value. In one aspect, the algorithm is a multidimensional algorithm which can be either a misuse detection algorithm or an anomaly detection algorithm or both. In one aspect of the method, the time without network activity comprises an estimate of the average processing delay required to compute trust values for neighboring node.

A computer readable storage medium storing a program of instructions executable by a machine to perform one or more methods described herein also may be provided.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

Figure 1:
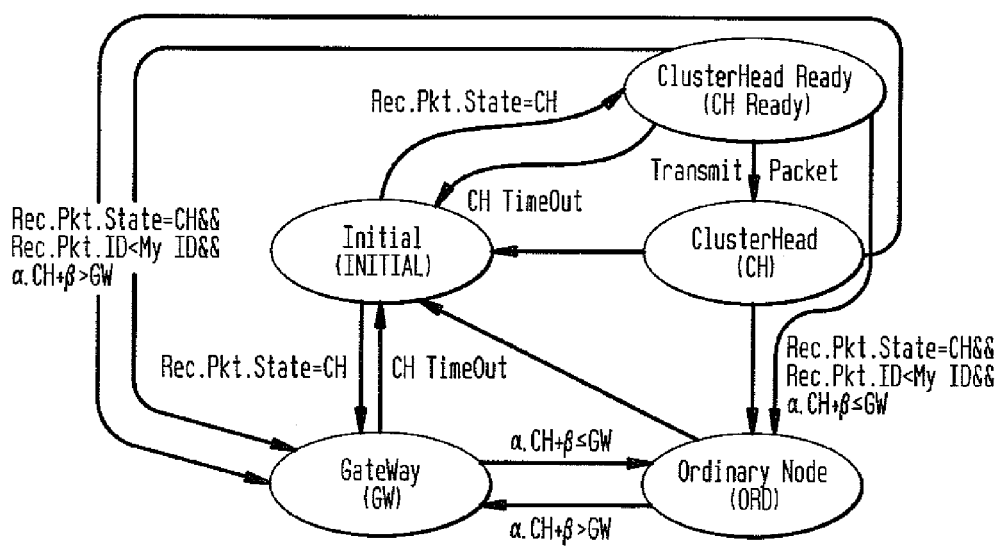
FIG. 1 shows the traditional state transition diagram (STD) for LIPC.

The inventive security system and method for PC-based ad hoc networks retains the Clusterhead (CH) and Gateway (GW) node selection framework developed for LIPC. The novel technique adds the capability to protect each node from malicious intruder attacks that could force illegal node state transitions and compromise secure routing of control packets or user traffic by adding a 'Trustworthy' event to each state in the unsecure LIPC cluster formation protocol. LIPC cluster formation does not require extra control packets, e.g., hello message with neighbor lists, to form clusters, nor an initialization period to enhance flooding efficiencies. Furthermore, LIPC operates in soft state clustering mode with a timeout feature to preserve freshness of the state of each node. LIPC nodes constantly monitor communication activities within their radio ranges in order to detect anomalies in the data received from surrounding nodes, and each LIPC node either allows or prevents a neighboring node from influencing the LIPC node's decision to transition to a new state.

In the inventive approach, the states in the LIPC cluster formation protocol are maintained while adding a 'Truswortthy' event to each state and providing a methodology that depends on the state of the transmitting node to quantify Trustworthy and derive a Trust Confidence Value (TCV) to represent the level of confidence in quantifying 'Trustworthy'. In the Trustworthy event, a receiving node analyzes header information in an incoming packet from a neighboring transmitting node and applies the multidimensonal security algorithms to derive a trust value that determines the trustworthiness of the transmitting node for its current state. If the receiving node trusts the transmitting node, the algorithm proceeds in accordance with the LIPC cluster formation protocol. If the receiving node does not trust the transmitting node, and is not participating in routing data packets, the receiving node will drop the packet and stop further processing. If the receiving node does not trust the transmitting node, but is participating in routing of data packets and the packet whose header is being processed is a data packet, then the receiving node will drop the packet, and initiate reverse flooding to set up an alternate route to bypass the untrusted transmitting node.

Each receiving LIPC node computes trust values for neighboring transmitting nodes and stores them in a Local Repository. The inventive method imposes increasing levels of trust on the transmitting nodes by weighting the computed trust value according to the relative importance of the transmitting nodes' states. Cluster head (CH) state is weighted most heavily followed by gateway (GW), ordinary (ORD) and INITIAL states. CH nodes collect neighbor information and relay intra-cluster packets; GW nodes relay inter-cluster packets, and ORD nodes only communicate with the CH. The TCV is used to dynamically update the weights assigned to the states. Accordingly, the need for LIPC nodes to exchange security-related information, e.g., trustworthiness of other nodes, as taught in the prior art, is eliminated, along with the corresponding communication overhead, storage and processing delay.

The novel multidimensional security system and method for the LIPC cluster formation protocol is designed for PC-based mobile ad hoc networks that rely exclusively on passive monitoring of local radio communications for security, cluster formation and routing. The inventive secure LIPC design focuses particularly on specific problems encountered in PC-based mobile ad hoc network environments, resulting in many differences between secure LIPC and other IDS-based schemes for wireless ad hoc networks. For example, the novel approach to solving the secure LIPC problem includes the following: a) adds a "Trustworthy" event to the receiving node state to mitigate node state transitions if the transmitting node is not trusted; b) uses a multidimensional security algorithm to derive trust values for the transmitting nodes; c) uses knowledge of the transmitting node state to vary the trust decisions computed for the transmitting node; d) derives and uses a state-dependent Trust Confidence Value (TCV) to dynamically update the weights assigned to each transmitting node state; e) does not exchange security-related information between LIPC nodes; and f) does not rely on explicit signaling to carry protocol-specific control packets.

A methodology to derive a Trust Confidence Value (TCV) that represents the level of confidence in the weighted trust values based on current knowledge of the trust value computation process at the receiving node is also presented. In one embodiment, the state-dependent weights that are assigned to the computed trust values are adjusted to maximize the TCV, and the updated weights are used the next time the receiving node processes an incoming packet.

FIG. 1 shows the traditional state transition diagram (STD) for LIPC that illustrates the steps for a receiving node to transition to a CH, GW, ORD or INITIAL state. CH nodes relay intra-cluster packets, and GW nodes forward inter-cluster flooding packets. ORD nodes participate only in intra-cluster communication and do not forward flooding packets. Nodes in the INITIAL state are candidates for CH or GW nodes. Any node can transition to a GW or INITIAL state node, only a cluster head ready (CH Ready) node can become a CH node, and a node in the INITIAL state cannot transition to a ORD node. Only a CH Ready node can declare itself to be a CH node if it does not hear from another CH node and it has application-level traffic to transmit. Cluster state information is carried at any protocol layer, e.g., network layer, because LIPC monitors broadcast packets to determine the next state transition. Events that trigger state transitions are receiving packets from neighboring nodes, and the CH timeout feature that preserves freshness of the state of each node and includes the processing delay for the node.

A receiving node reverts to the INITIAL state after a period of inactivity designated as "CH Time Out", that is, when there is no incoming or outgoing traffic for a period of time that is greater than the CH Time Out. For conventional LIPC, the CH Time Out that is used to refresh the node state is determined by network activity and the node's clustering state. For secure LIPC in the present invention, another factor is added to the CH Time Out, i.e., an estimate of the average processing delay required to compute trust values for neighboring nodes. The CH Time Out clock is not interrupted if the transmitting node is deemed to be untrustworthy.

On receiving additional packets, an INITIAL state node will transition to the GW or CH Ready state, if the transmitting node is, or is not, in the CH state, respectively. A receiving node in the CH Ready state can proceed in one of two ways. If the receiving node successfully transmits a packet, the node directly transitions to the CH state. If the receiving node receives incoming packets before getting an opportunity to transmit, then operations proceed as if the CH Ready node were a node in the CH state.

A CH node will transition to the GW state if three conditions are satisfied:

Condition (i): the received packet is from a CH node,

Condition (ii): the received packet ID (i.e., the ID of the corresponding transmitting node) is less than the ID of the receiving node, and Condition (iii): the number of GW nodes are less than an offset and scaled number of CH nodes. The ID should be a unique identifier for the node, e.g., the MAC address of the node.

Condition (ii) provides for network stability by limiting the number of transmissions that the CH node processes, while Condition (iii) supports better network adaptability and flexibility by controlling the number of GW nodes in the LIPC system. For example, if the scale factor is one (1) and the offset is zero (0), then Condition (iii) states that a transition from CH to GW cannot occur unless the number of CH nodes are greater than the number of GW nodes. A CH node transitions to an ORD state if Conditions (i) and (ii) above are satisfied, but Condition (iii) is not satisfied. An ORD node transitions to the GW state if Condition (iii) is not satisfied, and a GW node transitions to the ORD state if Condition (iii) is satisfied.

Figure 2:
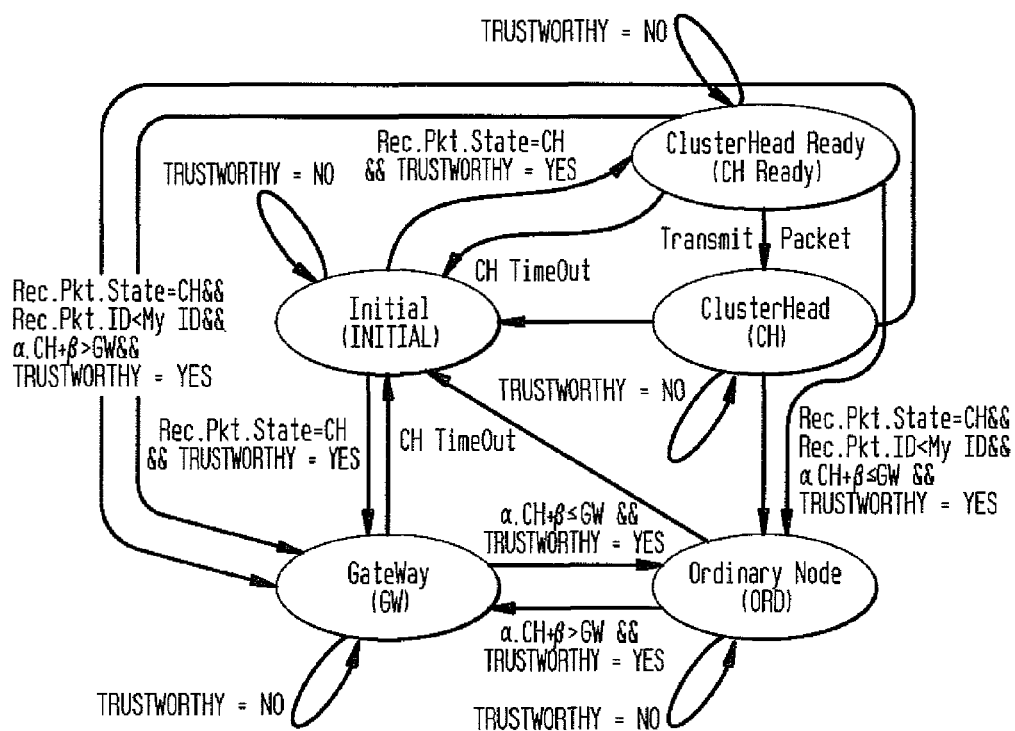
FIG. 2 depicts the STD for the inventive security method for the LIPC cluster formation protocol.

FIG. 2 depicts the STD for the inventive security method for the LIPC cluster formation protocol. Secure LIPC adds the novel Trustworthy event to the states shown in FIG. 1. If a neighboring transmitting node is trusted ("Trustworthy=Yes"), then operations at the corresponding receiving node proceed in accordance with the LIPC cluster formation protocol. If a neighboring transmitting node is not trusted ("Trustworthy=No"), then no state transition can occur at the corresponding receiving node. In this case, the receiving node stops further processing of the received packet, and awaits arrival of new packets to re-evaluate the trustworthiness of the transmitting node.

Figure 3:
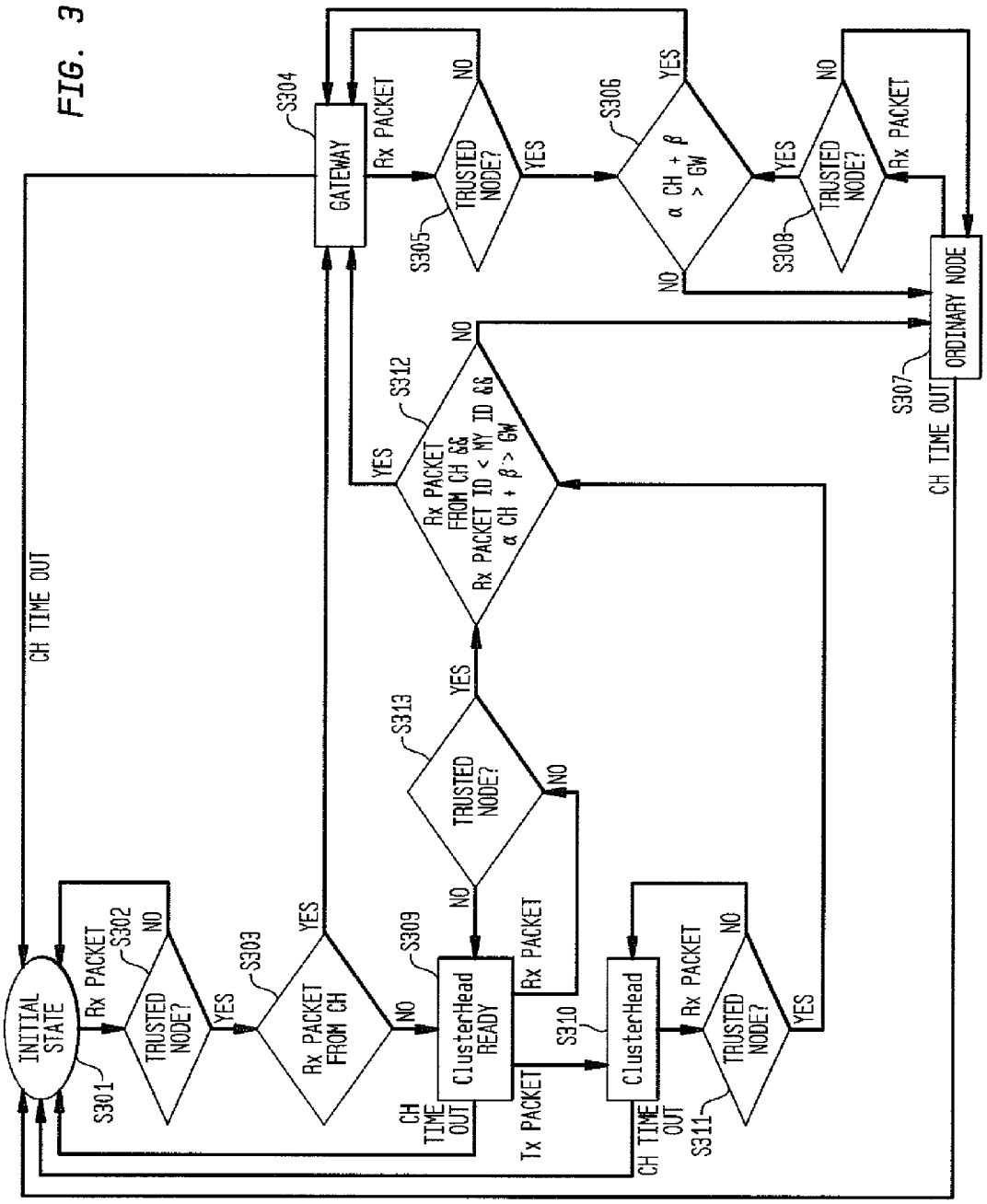
FIG. 3 is a flow diagram depicting the states and operational steps carried out by the inventive secure LIPC cluster formation protocol.

FIG. 3 is a flow diagram, in accordance with the states shown in FIG. 2, depicting the states and operational steps carried out by the inventive secure LIPC cluster formation protocol. As shown in FIG. 3, a receiving node will revert to the INITIAL state S301 after a period of inactivity designated as the CH Time Out event, when there is no incoming or outgoing traffic for a period greater than the CH Time Out.

On receiving a packet, the receiving node determines whether the packet is received from a Trusted Node by computing the trustworthiness of the neighboring transmitting node. If the transmitting node is a Trusted Node or is "Trustworthy" (S302=YES), then the state of the transmitting node is determined. If the transmitting node is in the CH state (S303=YES), then the receiving node transitions to the GW state in S304. If the transmitting node is not "Trustworthy" (S302=NO), then no state transition occurs, and the receiving node remains in the INITIAL state and processing returns to S301.

When in the GW state (S304), on receiving a packet, the receiving node computes the trustworthiness of the transmitting node. If it is a Trusted Node (S305=YES), then if a scaled number of CH nodes plus an offset is greater than the number of GW nodes, i.e., $\alpha$*CH+$\beta$>GW, (S306=YES), then the state remains GW at S304 (see Condition (iii) above). Otherwise (S306=NO), the receiving node is set to Ordinary Node state (ORD) at S307. As discussed above, the node can revert to the INITIAL state S301 when appropriate.

If the receiving node is not in the CH state (S303=NO), then the receiving node transitions to the CH Ready state at S309.

When the receiving node is in the CH Ready state at S309 and the receiving node successfully transmits a packet, then the receiving node directly transitions to a CH state at S310. When another packet is received, if this packet is a Trusted Node (S313=YES), then if the received packet is from a node in CH state and the received packet ID is less than the ID of the receiving node and the scaled number of CH nodes plus an offset is greater than the number of GW nodes, i.e., $\alpha$*CH+$\beta$>GW, (S312=YES), e.g., Conditions (i) (iii) above are met, then the state transitions to GW at S304. Otherwise (S312=NO), the receiving node is set to Ordinary Node state at S307.

Alternatively, when the receiving node is in the CH Ready state at S309 and the receiving node receives one or more incoming packets before transmission begins, then operations proceed as if the CH Ready node were a node in the CH state. If the incoming packet is a Trusted Node (S313=YES), then processing continues at S312 (described above). If the incoming packet is not a Trusted Node (S313=NO), then the receiving node remains in the CH Ready state at S309.

Figure 4:
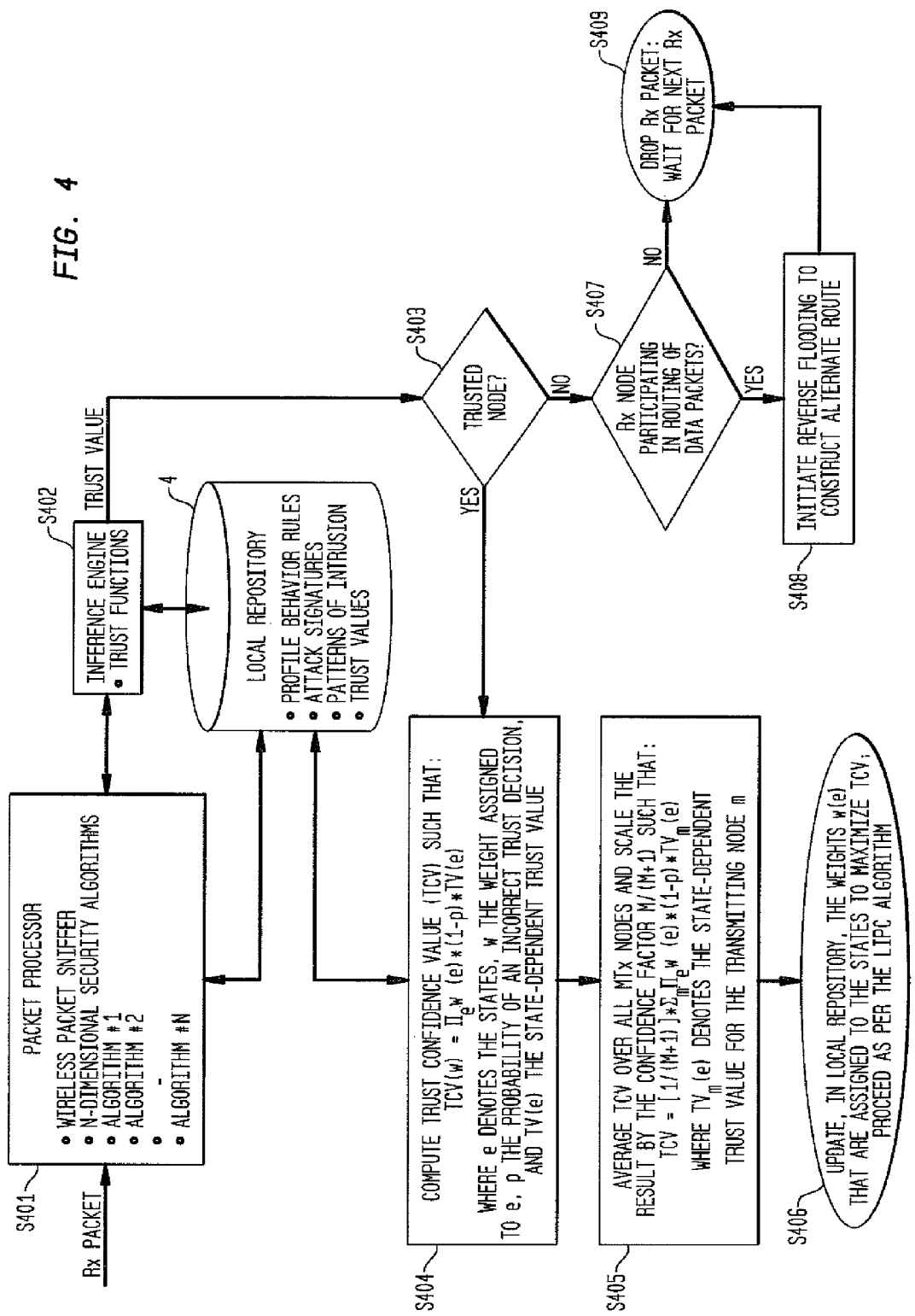
FIG. 4 is a flow diagram of the steps to determine the trustworthiness of neighboring transmitting nodes.

FIG. 4 is a flow diagram of the steps that each receiving node performs, when it receives a packet, to determine the trustworthiness of neighboring transmitting nodes. In step S401, the Packet Processor receives a packet and executes the Wireless Packet Sniffer and N-dimensional security algorithms. The Wireless Packet Sniffer decodes the packet header and forwards it to an N-dimensional security algorithm. By leveraging the rules, policies, profiles, e.g., profile behavior rules, signatures including attack signatures, trust values, and other patterns of intrusions stored in the Local Repository 4, the N-dimensional security algorithm extracts features consistent with normal and malicious behaviors and suspicious activity. The Local Repository 4 is updated with each new profile, signature and/or pattern for the transmitting node.

In step S402, the Inference Engine receives outputs from the Packet Processor and uses Inference Engine Trust Functions to derive trust values (including weights computed as described below) based on the Packet Processor outputs and historical trust values stored in the Local Repository. The Inference Engine returns updated trust values to the Local Repository, and outputs a binary representation of the trustworthiness of the transmitting node.

At step S403, if the receiving node determines that the transmitting node is trustworthy, e.g., TRUSTED NODE is yes (S403=YES), then the receiving node computes the Trust Confidence Value (TCV) at steps S404 and S405. In step S404, TCV is computed such that $TCV(w) = \Pi_e w(e) \cdot (1-p) \cdot TV(e)$, where:

e denotes the States, e.g., CH, GW, ORD, INITIAL,
w denotes the Weight assigned to e,
p denotes the Probability of an incorrect trust decision, and
TV(e) denotes the State-dependent trust value.

In step S405, TCV is averaged over all M transmitting nodes, and the result is scaled by the confidence factor M/(M+1) such that:

$$TCV=[1/(M+1)]*\Sigma_m \Pi_e w(e)*(1-p)*TV_m(e), \text{ where:}$$

$TV_m(e)$ denotes the state-dependent trust value for the transmitting node m.

The weights assigned to the receiving node states in steps S404 and S405 are adjusted to maximize TCV.

In step S406, the weights w(e) that are assigned to the states are updated to maximize TCV and the process continues in accordance with the LIPC algorithm, that is, the received packet is processed with the conventional LIPC cluster formation protocol. In addition, in step S406, the new weights are forwarded to Local Repository to be used by the Inference Engine to compute the Trust Value for the next received packet on receiving output from the Packet Processor at S401. In other words, these new weights are used in the next iteration.

Otherwise, if the receiving node determines that the transmitting node is not trustworthy, e.g., TRUSTED NODE is no (S403=NO), the participation of the routing of data packets is determined. If the receiving node is participating in routing of data packets (S407=YES), then in step S408, initiate reverse flooding to construct an alternate route that bypasses the untrusted transmitting node, drop the packet and wait for the next packet to arrive.

If the receiving node is not participating in routing of data packets (S407=NO), then in step S409 drop the received packet and wait for the next received packet.

Figures 1, 5:
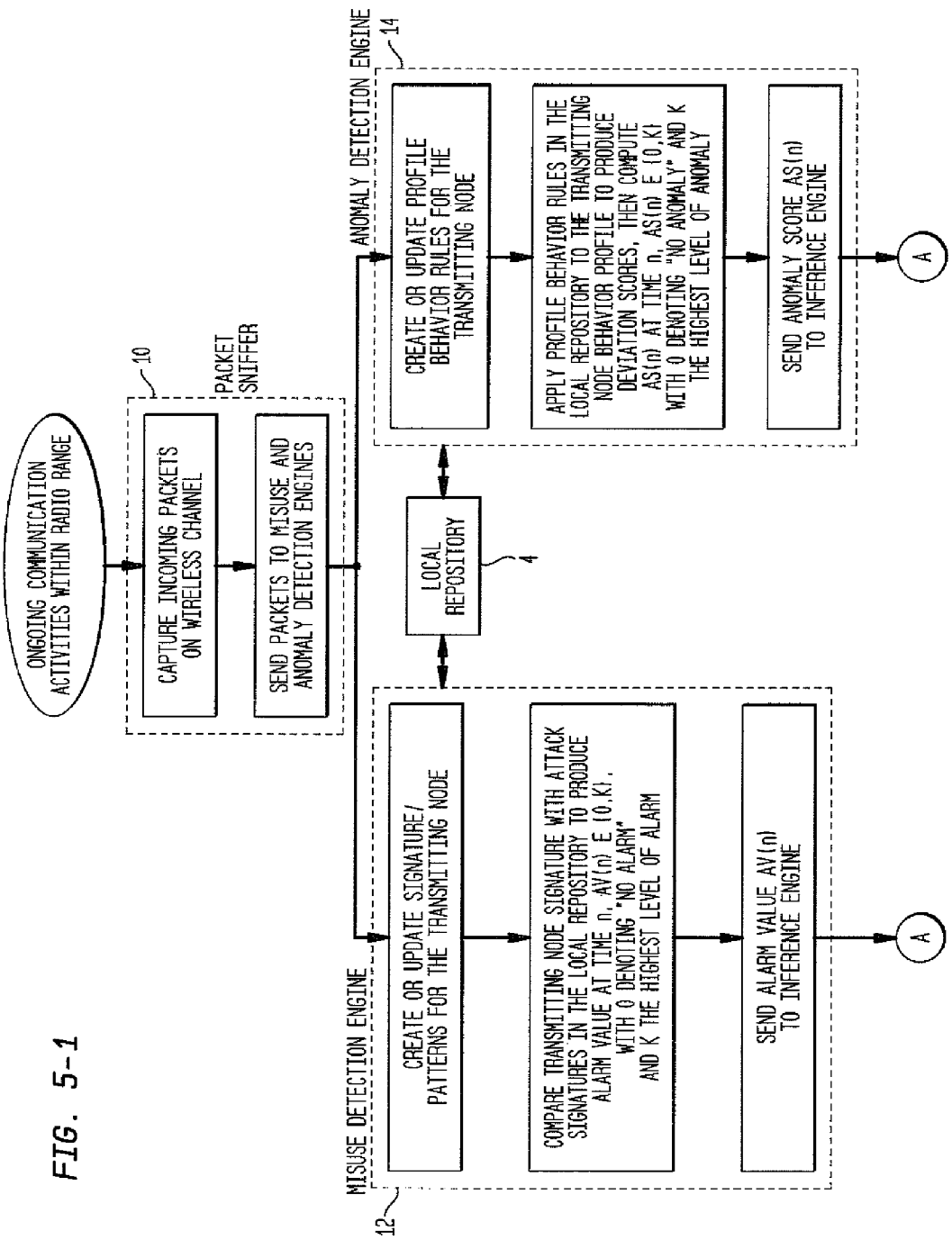
FIG. 5 shows exemplary system components that perform the inventive security method for the LIPC cluster formation protocol.
Figures 2, 5:
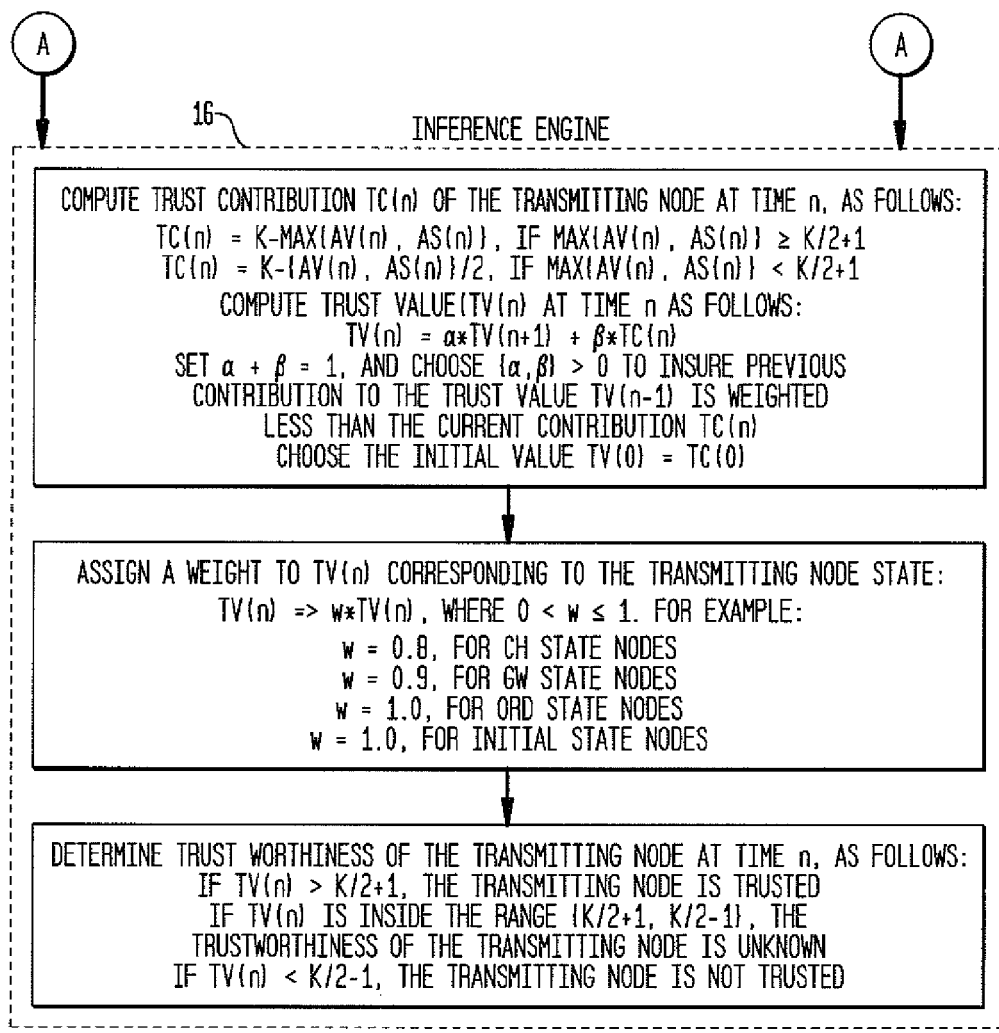

FIG. 5 shows exemplary components able to perform the steps of the inventive security method for the LIPC cluster formation protocol. These components include the Packet Processor 10 that implements a Wireless Packet Sniffer and a two-dimensional security algorithm, a Local Repository 4, the Misuse Detection Engine 12, the Anomaly Detection Engine 14 and the Inference Engine 16. In one embodiment, the components can be executed by a processor on a mobile device (not shown). The number and types of security algorithms are not specified in this method. The misuse detection and anomaly detection algorithms described in FIG. 5 are presented for illustration purposes only.

As shown in FIG. 5, the Packet Processor 10 captures incoming packets on the wireless channel and sends these packets to Misuse Detection 12 and Anomaly Detection 14 Engines. The output of the Packet Processor goes to the Misuse Detection Engine which processes the packet and derives an "Alarm Value" [AV(n)], and to the Anomaly Detection Engine which processes the packet and derives an "Anomaly Score" [AS(n)]. Next, the Inference Engine uses the algorithm illustrated in FIG. 4 to derive TV(n) from the inputs AV(n) and AS(n), and weights TV(n) by a factor that depends on the state of transmitting node (that is CH, GW, ORD or INITIAL). The Trustworthiness of the transmitting node is determined by the location of the weighted TV(n) in the range {0, K}, where K is an integer chosen to insure that the outputs of the misuse and detection anomaly detection engines are upper-bounded by K; the weights are obtained from Local Repository.

In the Misuse Detection engine, initially the contents of the packet create or update, in the Local Repository 4, signature and/or patterns for the transmitting nodes. Next, the transmitting node signature is compared with attack signatures in the Local Repository to produce the Alarm Value at time n, AV(n), where AV(n) is an integer between zero and K, with zero denoting "No Alarm" and K denoting the highest level of alarm. AV(n) is sent to the Inference Engine.

In the Anomaly Detection Engine, initially the contents of the packet create or update, in the Local Repository, the profile behavior rules for the transmitting node. Next, the profile behavior rules in the Local Repository are applied to the transmitting node behavior profile to produce deviation scores. Next the Anomaly Score at time n, AS(n), is computed, where AS(n) is an integer between zero and K, with zero denoting "No Anomaly" and K denoting the largest anomaly. AS(n) can be computed as follows.

If abnormal data is available, apply classification algorithm to deviation scores; if abnormal data in not available, compute normal clusters of deviation scores, then weighted sum of outliers in the clusters. Send AS(n) to Inference Engine.

In the Inference Engine, the following steps occur. Compute Trust Contribution TC(n) of the transmitting node at time n, as follows:

$$TC(n)=K-\max\{AV(n),AS(n)\}, \text{ if } \max\{AV(n), AS(n)\}>=K/2+1.$$

$$TC(n)=K-(AV(n)+AS(n))/2, \text{ if } \max\{AV(n),AS(n)\}< K/2+1.$$

Compute $TV(n)=\alpha*TV(n-1)+\beta*TC(n)$.

Set $\alpha+\beta=1$, and choose $\{\alpha, \beta\}>0$ to insure previous contribution to the trust value TV(n−1) is weighted less than the current contribution TC(n). Choose the initial value TV(0)=TC(0).

Next, assign a weight to TV(n) corresponding to the transmitting node state, e.g., $TV(n) \geq w*TV(n)$, where $0<w<=1$. For example, initially choose w=0.8 for CH state nodes, W=0.9 for GW state nodes, W=1.0 for ORD state nodes, W=1.0 for INITIAL state nodes. Weights will be updated and stored in the Local Repository, as discussed above.

Determine trustworthiness of the transmitting node at time n, as follows.

If TV(n)>K/2+1, then transmitting node is trusted.

If TV(n) is within the range {K/2+1, K/2−1}, the trustworthiness of the transmitting node is unknown.

If TV(n)<K/2−1, the transmitting node is not trusted.

One of the main results of the novel security technology for LIPC is to protect LIPC nodes from attacks by rogue or compromised nodes resulting in improper node state transitions, misdirection on routing, and disruption of the entire mobile ad hoc network traffic. In addition, the level of network traffic for LIPC is not increased by addition of the security method for LIPC because there is no need to exchange security-related information among the LIPC nodes. The robustness of the inventive security method is enhanced by leveraging a multidimensional set of security algorithms, which in combination can detect and identify potential security attacks that the use of one, or a smaller subset of, security algorithms could miss and/or generate false alarms.

Advantages of the inventive security system and method for LIPC over other IDS-based solutions for wireless ad hoc networks include incorporating a multidimensional set of security algorithms to account for the wide range of potential security attacks, and to minimize false alarms, integrating intrusion detection-based security scheme with LIPC, that takes advantage of LIPC capability to passively monitor local radio communications, to detect security breaches, avoiding explicit signaling to carry inter-node protocol-specific control packets, and achieving communications overhead efficiencies, maintaining existing node states in the LIPC cluster formation protocol, and therefore minimizing modifications to LIPC while adding security, using local host-based IDS that does not require the support of global IDS features to enhance the accuracy of the solution, and does not increase network traffic load. Additional benefits can include triggering LIPC node state transitions based on the receiving node's evaluation of the trustworthiness of the neighboring transmitting node, adding state-awareness to the derivation of trust values for the transmitting node, updating state-dependent weights assigned to trust values for the transmitting node based on the level of confidence that can be placed on an instance of the trust value given our current knowledge of the trustworthiness of the transmitting node, and accounting for average processing delays at the local LIPC node in the CH Timeout feature that refreshes LIPC node states.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc. The system also may be implemented on a virtual computer system, colloquially known as a cloud.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for security in mobile ad hoc networks with efficient flooding mechanism using Layer Independent Passive Clustering (LIPC), comprising steps of:

computing, using a processor, trustworthiness of a transmitting node, upon receiving a packet from the transmitting node;

when the transmitting node is not trustworthy, dropping the packet;

when the transmitting node is trustworthy and the receiving node is in CH state and when a transmitting node of another packet is trustworthy and the transmitting node of the other packet is in the CH state and received packet ID is less than ID of the receiving node and a number of GW nodes are less than the offset and the scaled number of CH nodes, transitioning the receiving node to the GW state;

when the transmitting node is trustworthy and the receiving node is in the CH state and when the transmitting node of the other packet is trustworthy and the transmitting node of the other packet is in CH state, the received packet ID is less than the ID of the receiving node, the number of GW nodes are greater than or equal to the offset and the scaled number of CH nodes, transitioning the receiving node to ORD state;

when the transmitting node is trustworthy and the receiving node is in the GW state and the number of GW nodes are greater than or equal to an offset and scaled number of CH nodes, transitioning the receiving node to the ORD state;

when the transmitting node is trustworthy and the receiving node is in the CH Ready state and the packet is to be transmitted, transitioning the receiving node to the CH state;

when the transmitting node is trustworthy and the receiving node is in the CH Ready state and the other packet is received before the packet is transmitted and when the transmitting node of the other packet is trustworthy and the transmitting node of the other packet is in the CH state and the received packet ID is less than the ID of the receiving node and the number of GW nodes are less than the offset and the scaled number of CH nodes, transitioning the receiving node to the GW state;

when the transmitting node is trustworthy and the receiving node is in the CH Ready state and the other packet is received before the packet is transmitted and when the transmitting node of the other packet is trustworthy and the transmitting node of the other packet is in the CH state, the received packet ID is less than the ID of the receiving node, the number of GW nodes are greater than or equal to the offset and the scaled number of CH nodes, transitioning the receiving node to the ORD state;

when the transmitting node is trustworthy and the receiving node is in the ORD state and the other packet is received before the packet is transmitted and when the transmitting node of the other packet is trustworthy and the number of GW nodes are less than the offset and the scaled number of CH nodes, transitioning the receiving node to the GW state;

when the transmitting node is trustworthy and the receiving node is in INITIAL state and when the transmitting node of the other packet is trustworthy and the transmitting node of the other packet is not in the CH state, transitioning the receiving node to the CH Ready state;

when the transmitting node is trustworthy and the receiving node is in the INITIAL state and when the transmitting node of the other packet is trustworthy and the transmitting node of the other packet is in the CH state, transitioning the receiving node to the GW state; and when a time without network activity has elapsed, transitioning the received node to the INITIAL state.

2. The method according to claim 1, wherein the step of computing trustworthiness comprises steps of:
processing the received packet in accordance with an algorithm and a local repository;
executing an inference engine;
computing a trust confidence value; and
averaging the trust confidence value.

3. The method according to claim 2, wherein the step of computing the trust confidence value is performed with state values, weight values assigned to the state values, and a probability based on a trust decision and the weight values maximize the trust confidence value.

4. The method according to claim 2, wherein the algorithm is one of a misuse detection algorithm and an anomaly detection algorithm.

5. The method according to claim 2, wherein the algorithm is a multidimensional set of security algorithms.

6. The method according to claim 1, wherein the time without network activity comprises an estimate of the average processing delay required to compute trust values for neighboring nodes.

7. A system for security in mobile ad hoc networks with efficient flooding mechanism using Layer Independent Passive Clustering (LIPC), comprising:
a processor; and
a module operable to compute trustworthiness of a transmitting node, upon receiving a packet from the transmitting node; when the transmitting node is not trustworthy, to drop the packet; when the transmitting node is trustworthy and the receiving node is in CH state and when a transmitting node of an other packet is trustworthy and the transmitting node of the other packet is in the CH state and received packet ID is less than ID of the receiving node and a number of GW nodes are less than the offset and the scaled number of CH nodes, to transition the receiving node to the GW state; when the transmitting node is trustworthy and the receiving node is in the CH state and when the transmitting node of the other packet is trustworthy and the transmitting node of the other packet is in CH state, the received packet ID is less than the ID of the receiving node, the number of GW nodes are greater than or equal to the offset and the scaled number of CH nodes, to transition the receiving node to ORD state; when the transmitting node is trustworthy and the receiving node is in the GW state and the number of GW nodes are greater than or equal to an offset and scaled number of CH nodes, to transition the receiving node to the ORD state; when the transmitting node is trustworthy and the receiving node is in the CH Ready state and the packet is to be transmitted, to transition the receiving node to the CH state; when the transmitting node is trustworthy and the receiving node is in the CH Ready state and the other packet is received before the packet is transmitted and when the transmitting node of the other packet is trustworthy and the transmitting node of the other packet is in the CH state and the received packet ID is less than the ID of the receiving node and the number of GW nodes are less than the offset and the scaled number of CH nodes, to transition the receiving node to the GW state; when the transmitting node is trustworthy and the receiving node is in the CH Ready state and the other packet is received before the packet is transmitted and when the transmitting node of the other packet is trustworthy and the transmitting node of the other packet is in the CH state, the received packet ID is less than the ID of the receiving node, the number of GW nodes are greater than or equal to the offset and the scaled number of CH nodes, to transition the receiving node to the ORD state; when the transmitting node is trustworthy and the receiving node is in the ORD state and the other packet is received before the packet is transmitted and when the transmitting node of the other packet is trustworthy and the number of GW nodes are less than the offset and the scaled number of CH nodes, to transition the receiving node to the GW state; when the transmitting node is trustworthy and the receiving node is in INITIAL state and when the transmitting node of the other packet is trustworthy and the transmitting node of the other packet is not in the CH state, to transition the receiving node to the CH Ready state; when the transmitting node is trustworthy and the receiving node is in the INITIAL state and when the transmitting node of the other packet is trustworthy and the transmitting node of the other packet is in the CH state, to transition the receiving node to the GW state; and when a time without network activity has elapsed, to transition the received node to the INITIAL state.

8. The system according to claim 7, the module further operable to compute trustworthiness by performing:
processing the received packet in accordance with an algorithm and a local repository;
executing an inference engine;
computing a trust confidence value; and
averaging the trust confidence value.

9. The system according to claim 8, wherein the trust confidence value is computed with state values, weight values assigned to the state values, and a probability based on a trust decision and the weight values maximize the trust confidence value.

10. The system according to claim 8, wherein the algorithm is one of a misuse detection algorithm and an anomaly detection algorithm.

11. The system according to claim 8, wherein the algorithm is a multidimensional set of security algorithms.

12. The system according to claim 7, wherein the time without network activity comprises an estimate of the average processing delay required to compute trust values for neighboring nodes.

13. A computer readable storage device storing a program of instructions executable by a machine to perform a method for security in mobile ad hoc networks with efficient flooding mechanism using Layer Independent Passive Clustering (LIPC), comprising:
computing, using a processor, trustworthiness of a transmitting node, upon receiving a packet from the transmitting node;
when the transmitting node is not trustworthy, dropping the packet;

when the transmitting node is trustworthy and the receiving node is in CH state and when a transmitting node of an other packet is trustworthy and the transmitting node of the other packet is in the CH state and received packet ID is less than ID of the receiving node and a number of GW nodes are less than the offset and the scaled number of CH nodes, transitioning the receiving node to the GW state;

when the transmitting node is trustworthy and the receiving node is in the CH state and when the transmitting node of the other packet is trustworthy and the transmitting node of the other packet is in CH state, the received packet ID is less than the ID of the receiving node, the number of GW nodes are greater than or equal to the offset and the scaled number of CH nodes, transitioning the receiving node to ORD state;

when the transmitting node is trustworthy and the receiving node is in the GW state and the number of GW nodes are greater than or equal to an offset and scaled number of CH nodes, transitioning the receiving node to the ORD state;

when the transmitting node is trustworthy and the receiving node is in the CH Ready state and the packet is to be transmitted, transitioning the receiving node to the CH state;

when the transmitting node is trustworthy and the receiving node is in the CH Ready state and the other packet is received before the packet is transmitted and when the transmitting node of the other packet is trustworthy and the transmitting node of the other packet is in the CH state and the received packet ID is less than the ID of the receiving node and the number of GW nodes are less than the offset and the scaled number of CH nodes, transitioning the receiving node to the GW state;

when the transmitting node is trustworthy and the receiving node is in the CH Ready state and the other packet is received before the packet is transmitted and when the transmitting node of the other packet is trustworthy and the transmitting node of the other packet is in the CH state, the received packet ID is less than the ID of the receiving node, the number of GW nodes are greater than or equal to the offset and the scaled number of CH nodes, transitioning the receiving node to the ORD state;

when the transmitting node is trustworthy and the receiving node is in the ORD state and the other packet is received before the packet is transmitted and when the transmitting node of the other packet is trustworthy and the number of GW nodes are less than the offset and the scaled number of CH nodes, transitioning the receiving node to the GW state;

when the transmitting node is trustworthy and the receiving node is in INITIAL state and when the transmitting node of the other packet is trustworthy and the transmitting node of the other packet is not in the CH state, transitioning the receiving node to the CH Ready state;

when the transmitting node is trustworthy and the receiving node is in the INITIAL state and when the transmitting node of the other packet is trustworthy and the transmitting node of the other packet is in the CH state, transitioning the receiving node to the GW state; and when a time without network activity has elapsed, transitioning the received node to the INITIAL state.

14. The program according to claim 13, wherein the step of computing trustworthiness comprises steps of:
  processing the received packet in accordance with an algorithm and a local repository;
  executing an inference engine;
  computing a trust confidence value; and
  averaging the trust confidence value.

15. The program according to claim 14, wherein the step of computing the trust confidence value is performed with state values, weight values assigned to the state values, and a probability based on a trust decision and the weight values maximize the trust confidence value.

16. The program according to claim 14, wherein the algorithm is one of a misuse detection algorithm and an anomaly detection algorithm.

17. The program according to claim 14, wherein the algorithm is a multidimensional set of security algorithms.

18. The program according to claim 13, wherein the time without network activity further comprises an estimate of the average processing delay required to compute trust values for neighboring nodes.

* * * * *

UNITED STATES PATENT AND TRADEMARK OFFICE
CERTIFICATE OF CORRECTION

| | |
|---|---|
| PATENT NO. | : 8,490,175 B2 |
| APPLICATION NO. | : 13/312250 |
| DATED | : July 16, 2013 |
| INVENTOR(S) | : Barton et al. |

It is certified that error appears in the above-identified patent and that said Letters Patent is hereby corrected as shown below:

On the title page, item (57), under "ABSTRACT", in Column 2, Line 4, delete "'Trusworthy'" and insert -- 'Trustworthy' --, therefor.

On title page 2, item (56), References Cited under "OTHER PUBLICATIONS", in Column 2, Line 6, delete "Digitial" and insert -- Digital --, therefor.

In the Specification

Column 1, Line 39, delete "info nation," and insert -- information, --, therefor.

Column 1, Line 48, delete "Rivest-Shamir-Aldeman" and insert -- Rivest-Shamir-Adleman --, therefor.

Column 5, Lines 50-51, delete "'Trusworthy'" and insert -- 'Trustworthy' --, therefor.

Column 5, Line 57, delete "multidimensonal" and insert -- multidimensional --, therefor.

Column 6, Line 59, delete "a ORD" and insert -- an ORD --, therefor.

Signed and Sealed this
Twenty-fifth Day of November, 2014

Michelle K. Lee
*Deputy Director of the United States Patent and Trademark Office*